United States Patent [19]
Nishikawa et al.

[11] Patent Number: 4,612,822
[45] Date of Patent: Sep. 23, 1986

[54] TILT STEERING EQUIPMENT

[75] Inventors: Masumi Nishikawa, Toyoake; Masanobu Ishikawa, Nagoya; Hiroki Sato, Aichi; Shuhei Toyoda, Toyota; Hakumi Ishii, Okazaki, all of Japan

[73] Assignees: Aisin Seiki Kabushiki Kaisha, Kariya; Toyota Jidosha Kabushiki Kaisha, Toyota, both of Japan

[21] Appl. No.: 620,337

[22] Filed: Jun. 13, 1984

[30] Foreign Application Priority Data

Jun. 13, 1983 [JP] Japan .................. 58-105209
Jun. 13, 1983 [JP] Japan .................. 58-105210
Jun. 13, 1983 [JP] Japan .................. 58-90069[U]

[51] Int. Cl.⁴ .............................. B62D 1/18
[52] U.S. Cl. .................... 74/493; 74/409; 74/805; 280/775
[58] Field of Search ............ 74/409, 493, 805; 280/775

[56] References Cited

U.S. PATENT DOCUMENTS

| | | | |
|---|---|---|---|
| 2,404,116 | 7/1946 | Wolowicz et al. | 74/805 X |
| 2,464,856 | 3/1949 | Finley | 74/493 |
| 2,836,988 | 6/1958 | Cashman | 74/493 |
| 3,208,293 | 9/1965 | Boehm | 74/805 X |
| 3,216,521 | 11/1965 | Ulrich | 74/493 X |

FOREIGN PATENT DOCUMENTS 56-27176 3/1981 Japan .

Primary Examiner—Allan D. Herrmann
Attorney, Agent, or Firm—Oblon, Fisher, Spivak, McClelland & Maier

[57] ABSTRACT

In a tilt steering equipment including a main bracket mounted to a vehicle body; an upper bracket with a steering wheel, which is pivoted at the main bracket around a tilt center; and a driving means supported by the main bracket to tilt the upper bracket against the main bracket, the driving means in fixed to the main bracket and has a drive center spaced from the tilt center and an engaging pin which rotates around the drive center. The upper bracket has an engaging slotted hole in which the engaging pin is inserted. According to the tilt steering equipment of this invention, the drive center of the driving means is spaced from the tilt center. Therefore, it is easy to assemble the equipment with high accuracy and a smaller torque is enough to tilt the upper bracket to the main bracket.

13 Claims, 12 Drawing Figures

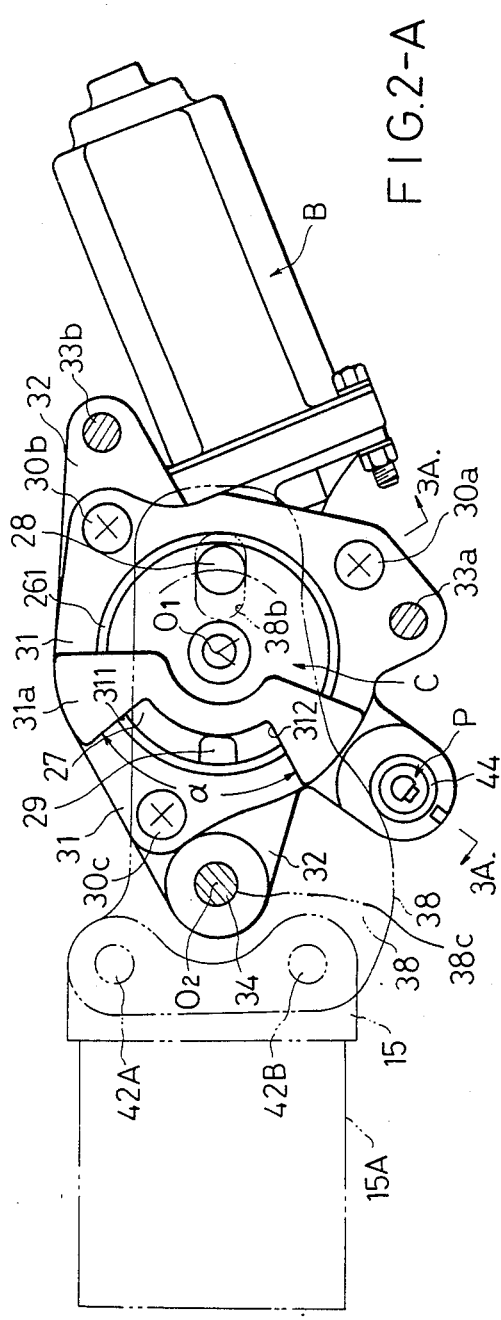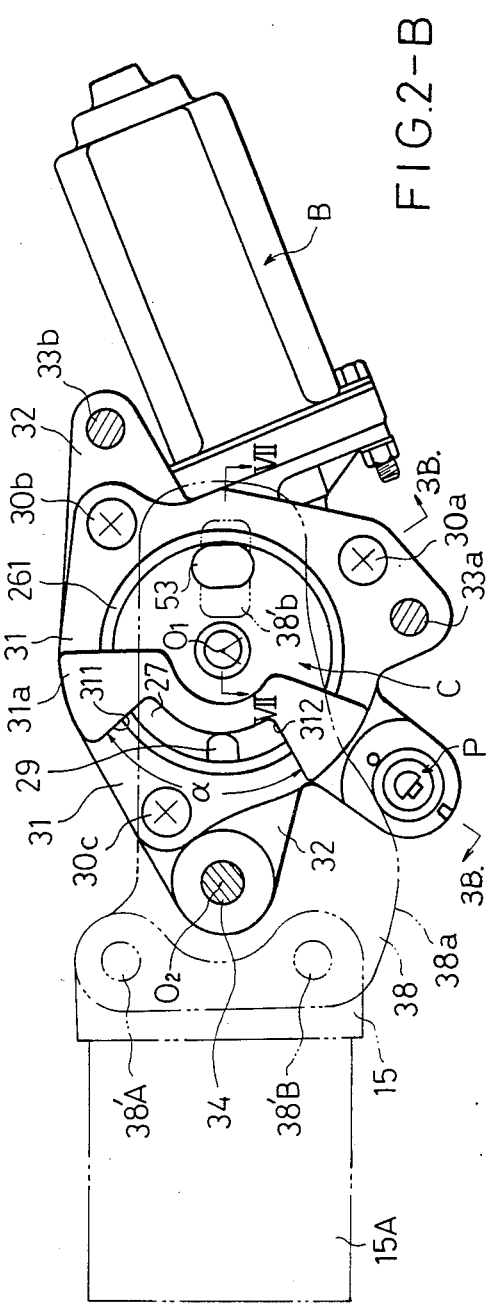

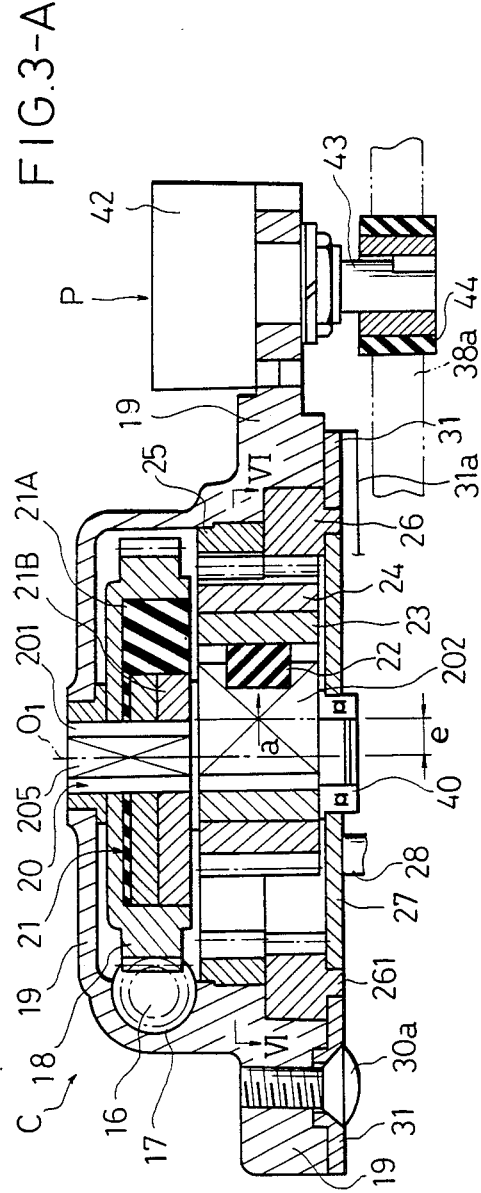
FIG.3-A
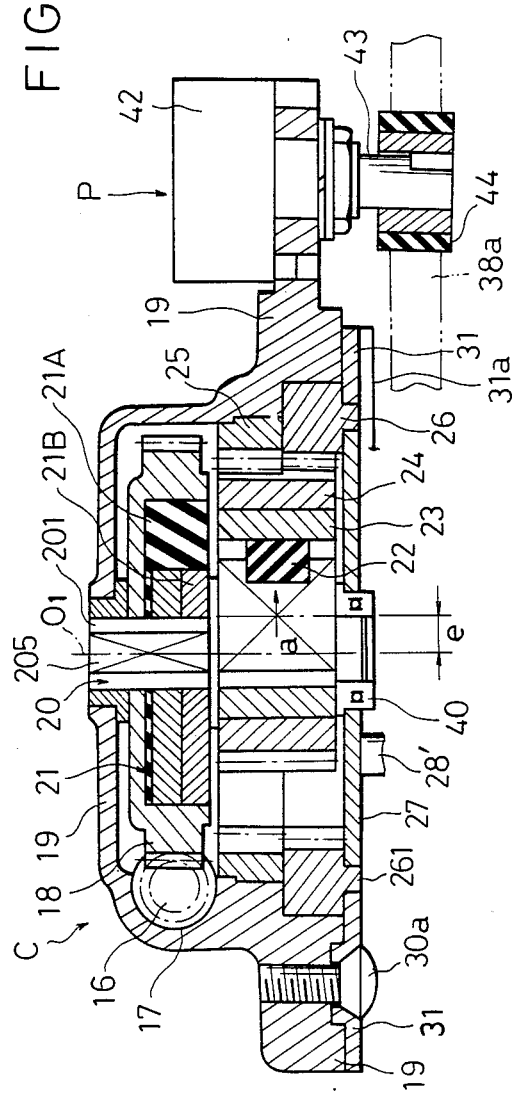
FIG.3-B

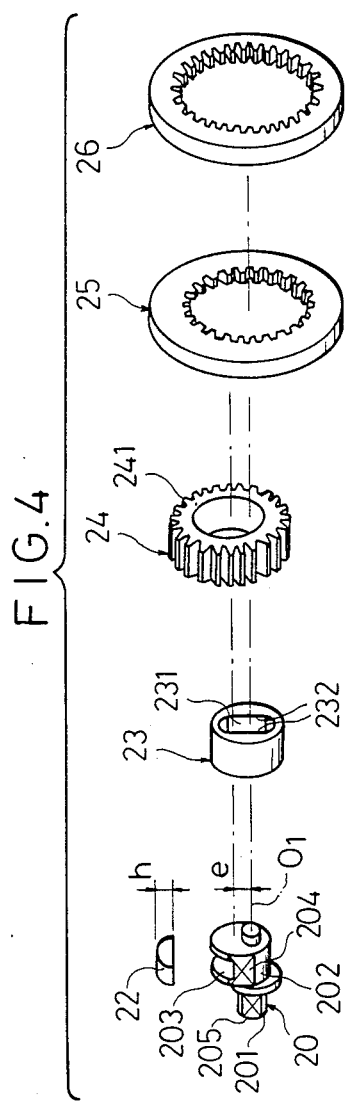
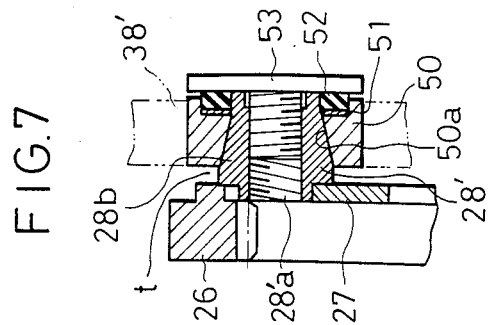
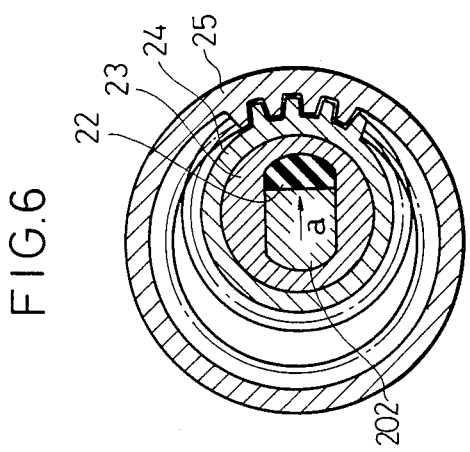
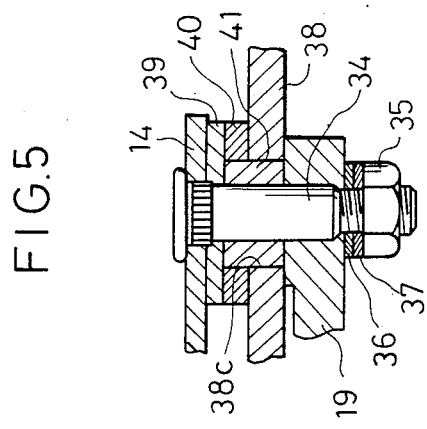

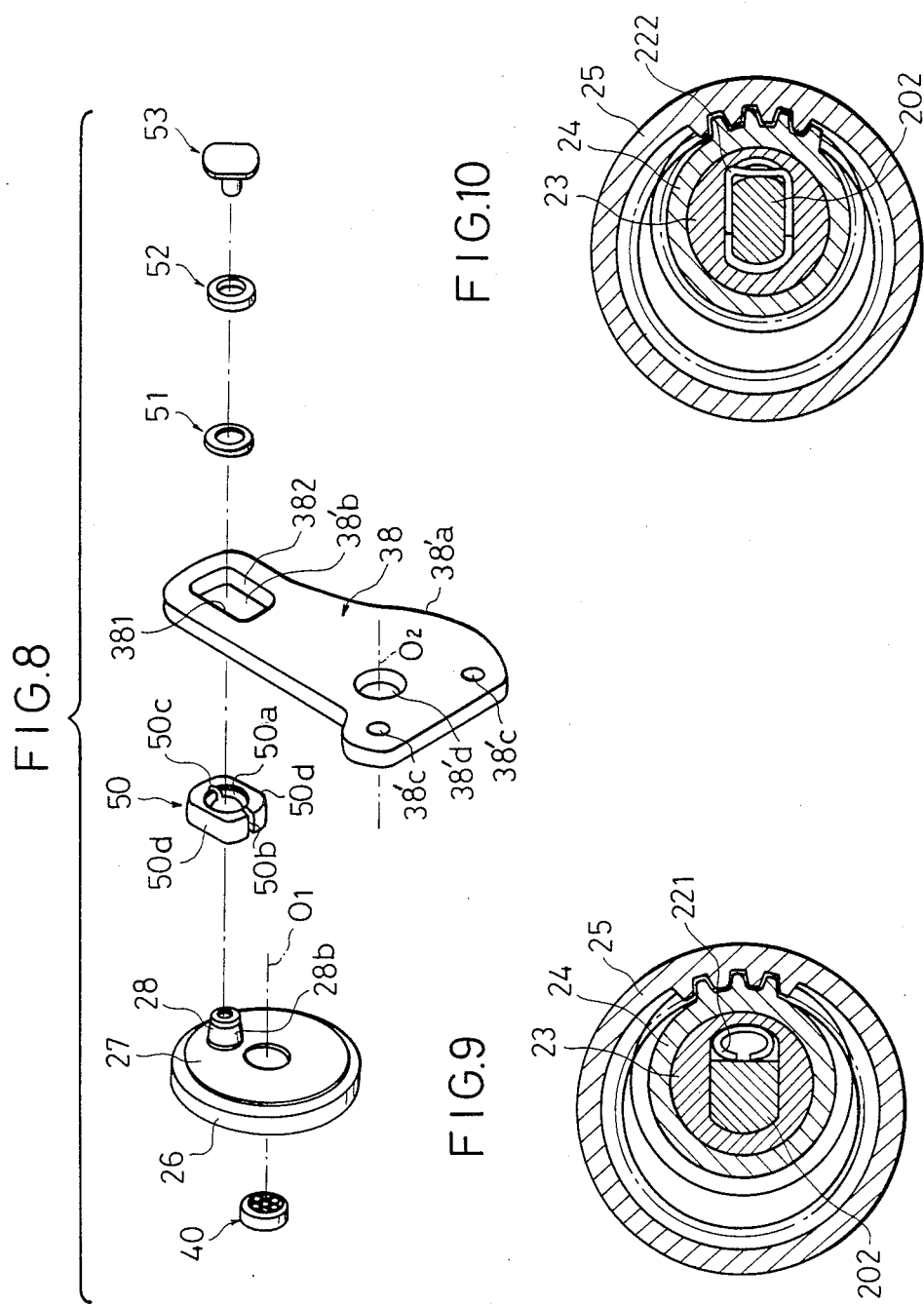

TILT STEERING EQUIPMENT

BACKGROUND OF THE INVENTION

1. Field of the Invention

This invention relates to a tilt steering equipment for adjusting a tilt angle of a steering wheel, and more particularly to a tilt steering equipment for obtaining a proper tilt operating angle of the steering wheel by preventing backlashes created at pivot portions of the equipment or at gear engagement portions of a reduction gear mechanism thereof.

2. Description of the Related Art

As a conventional tilt steering equipment of this type, for example, there have been proposed an equipment described in a Japanese unexamined published utility model application No. 27176/1981 having the same applicant as the assignee of the present application, in which a tilt center and drive center are on a coaxial line to each other.

In the 27176/1981 equipment, since both of the tilt center and the drive center are on the coaxial line, it is difficult to mount a rotary driving source and a reduction gear mechanism to a main bracket after they are individually assembled. Therefore, the 27176/1981 equipment has disadvantage such as poor efficiency in assembly of the equipment.

SUMMARY OF THE INVENTION

Accordingly, one object of the present invention is to provide an improved tilt steering equipment which is free from the aforesaid disadvantages of the prior art.

Another object of the present invention is to provide an improved tilt steering equipment which has few errors in assembly thereof and which facilitates proper adjustment of a tilt operating angle of the steering wheel.

A further object of the present invention is to provide an improved tilt steering wheel which is small in size and which is economically inexpensive in production thereof.

A still further object of the present invention is to provide an improved tilt steering equipment which is constructed so as to prevent occurrence of small gaps in pivot portions thereof.

A still further object of the present invention is to provide an improved tilt steering equipment including a reduction gear mechanism which is constructed so as to prevent backlashes due to small gaps to be produced by the engagement of gears therein.

A tilt steering equipment according to the present invention comprises a main bracket mounted to a vehicle body; an upper bracket being supported at the main bracket in a movable manner with a tilt center thereof used as the movement center, in which a steering wheel is rotatably supported; and a driving means supported at one of the main bracket and the upper bracket for moving the upper bracket to the main bracket for tilting the steering wheel. The driving means has a drive center which is different from the tilt center and includes a first engaging means. On the other hand, the other one of the main bracket and the upper bracket has a second engaging means to be associated with the first engaging means. By the driving means, the first engaging means is moved round the drive center thereof. By the movement of the first engaging means, the other one (for example the upper bracket) is tilted against the one (for example the main bracket) through the second engaging means associated with the first engaging means. The driving means may include a rotary driving source and a reduction gear mechanism, and preferably an electric motor can be used as the rotary driving source. However, this rotary driving source of this invention is not limited to the aforesaid electric motor, or it may be driven by manual operation to transmit the driving force.

According to the present invention, after the rotary driving source and the reduction gear mechanism are assembled individually, it is possible to mount them to the main bracket and the upper bracket, respectively. Therefore, when compared with an equipment of the type in which the tilt center coincides with the drive center in the center axis thereof, the improved tilt steering equipment of this invention can be assembled with ease and high accuracy so that an assemble error is hard to occur therein.

Moreover, when compared with the equipment of the prior application in which both the tilt center and the drive center do not coincide, the equipment of the present invention can decrease a distance from the drive center to a first engaging means which may be an output shaft of the reduction gear mechanism compared with a distance from the tilt center to the first engaging means. Therefore some reduced force of the external force to be applied to the steering wheel is applied to the reduction gear mechanism. As a result, the reduction gear is able to be compactly constructed and because of use of the compact reduction gear and it is also possible to enlarge a space around a driver (a driving space). Further, the tilt steering equipment of this invention does not use a link member projecting to the driving space, as used in the equipment of the prior application, but may use an engaging plate which lengthens in the direction of the steering shaft. Therefore, the engaging plate does not take so much space and can reduce the size of pivot portions required for the equipment, whereby generation of backlashes in the equipment can be also reduced.

Further, to prevent occurrence of backlashes at the pivot portions of the tilt steering equipment according to the present invention it may be also constructed as follows.

Namely, the first engaging means may include an engaging pin and a slider which is fitted to the outer periphery of the pin in a rotatable manner relative to the pin. The second engaging means may be provided with an engaging slotted hole longer in the longitudinal direction of the second engaging means and supporting the slider in a slidable manner at a pair of guide faces thereof opposite to each other. In this case, the pin is formed into a tapered shape, whereas the slider includes a tapered-shaped axial hole therein to be fitted with the tapered pin, at least one slit extending to the axial hole and a pair of sliding surfaces divided by the slit, the sliding surfaces being in slidable contact with the pair of guide faces of the hole formed in the second engaging member. Between the tapered pin and the slider, there is also interposed a pressing means for pushing the slider against the tapered pin. By the pushing force of the pressing means, the slider is able to always be in contact with the pin, while the slit formed in the sliding member is opened to make the pair of sliding surfaces in contact with the pair of guide faces formed in the second engaging means, at all times.

In this case, the slider is a member which is slidable in the longitudinal direction of the slotted hole formed in the second engaging member, and the tapered hole of the slider formed at the center thereof can be expanded or contracted in the radial direction thereof. For this purpose, preferably, one or more slits are formed in the slider in the axial direction thereof.

The pressing means, preferably, comprises a flanged pin member being coaxially screwed at the tip end of the tapered association pin; and a rubber elastic member with a washer to be pressed by the flange portion of the pin member. However, the pressing means according to the present invention is not limited to the aforesaid construction. For example, as the elastic member, a spring, or a dashed spring may be also employed, or the washer is not necessarily employed for this purpose. When the washer is employed, the washer and elastic member may be formed in one body. Or otherwise, a C-ring may be also employed in place of the flanged pin member.

According to the present invention having the aforesaid construction, it is possible to prevent backlashes from being produced at the pivot portions of the equipment. Moreover, by the pushing action of the pressing means, wear and tear of the pivot portions to be cuased by the relative rotation or the relative sliding in the equipment can be also prevented. And therefore, even is such small gaps are formed in the pivot portions, there is no fear that the gaps are extended because of long use thereof. As a result, it is possible to adjust properly the tilt angle of the steering wheel at all times and therefore, a driver is free from an umpleasantness based on knocking vibrations to be caused by such small gaps formed in the pivot portions of the equipment.

On the other hand, the following reduction gear mechanism may be used for the tilt steering equipment of the present invention.

Namely, in the reduction gear which comprises a housing fixed to one of the brackets; an eccentric shaft comprising a center shaft portion for an input means of the reduction gear mechanism being rotatably supported at the housing and an eccentric shaft portion (an arm portion) being fixed to the center shaft portion so as to be integrally rotated with the center shaft portion; a planetary gear being rotatably supported at the tip end of the eccentric shaft portion; an internal gear being fixed to the housing and being engaged with the planetary gear; and another internal gear for an output means of the reduction gear mechanism being engaged with the planetary gear, the eccentric shaft portion, by which the planetary gear is supported in a rotatable manner, is provided with a pressing means for forcing the planetary gear in the centrifugal direction of the eccentric shaft portion in parallel to the axis of the planetary gear, whereby the planetary gear is pushed against at least the fixed internal gear.

In this case, as the pressing means, it is preferable that an elastic member having elasticity, such as rubber, is disposed at the tip end portion of the eccentric shaft portion so as to generate the pushing force of the elastic member in the direction of the planetary gear being engaged with the fixed internal gear. However, the pressing means is not limited to the aforesaid construction.

According to the reduction gear constructed as described above, it is possible to prevent small gaps from being formed at the engagement of gears and also even when gear tooth wear down, this wear on gear tooth can be compensated by an elastic force of the elastic member. In case where this elastic member is particularly applied to the reduction gear in the tilt steering equipment, a proper tilt angle of the steering wheel can be obtained without bringing a driver unpleasantness of backlashes caused by the small gaps in the reduction gear. On the other hand, when a load is applied to the reduction gear from the output shaft side thereof, the applied load thereto is converted into a force based on the pressure angle of the gear. And therefore, the elastic member is only necessary to have a relatively small elastic force. Further, occurrence of the small gaps can be also prevented with a small space not to change the original construction of the gear.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2-A is a partial enlarged side view as seen from the back side of the sheet face of FIG. 1 in the vertical direction thereof, which shows a rotary driving source B and a reduction gear mechanism C included in the invention;

FIG. 2-B is also a partial enlarged side view similar to FIG. 2-A but a second embodiment;

FIG. 3-A is an enlarged sectional view of the reduction gear mechanism C taken along the line 3A—3A of FIG. 2-A;

FIG. 3-B is an enlarged sectional view of the reduction gear mechanism C taken along the line 3B—3B of FIG. 2-B;

FIG. 4 is a perspective view illustrating the state wherein the reduction gear mechanism of FIG. 3-A is partially disassembled;

FIG. 5 is a sectional view taken along the line V—V of FIG. 1;

FIG. 6 is a sectional view taken along the line VI—VI of FIG. 3-A;

FIG. 7 is a sectional view taken along the line VII—VII of FIG. 2-B;

FIG. 8 is a perspective view illustrating the state wherein the parts shown in FIG. 7 are disassembled;

FIG. 9 is a sectional view similar to FIG. 6, but of a third embodiment; and

FIG. 10 is a sectional view similar to FIG. 6, but of a fourth embodiment.

DESCRIPTION OF THE PREFERRED EMBODIMENTS

Figure 1:
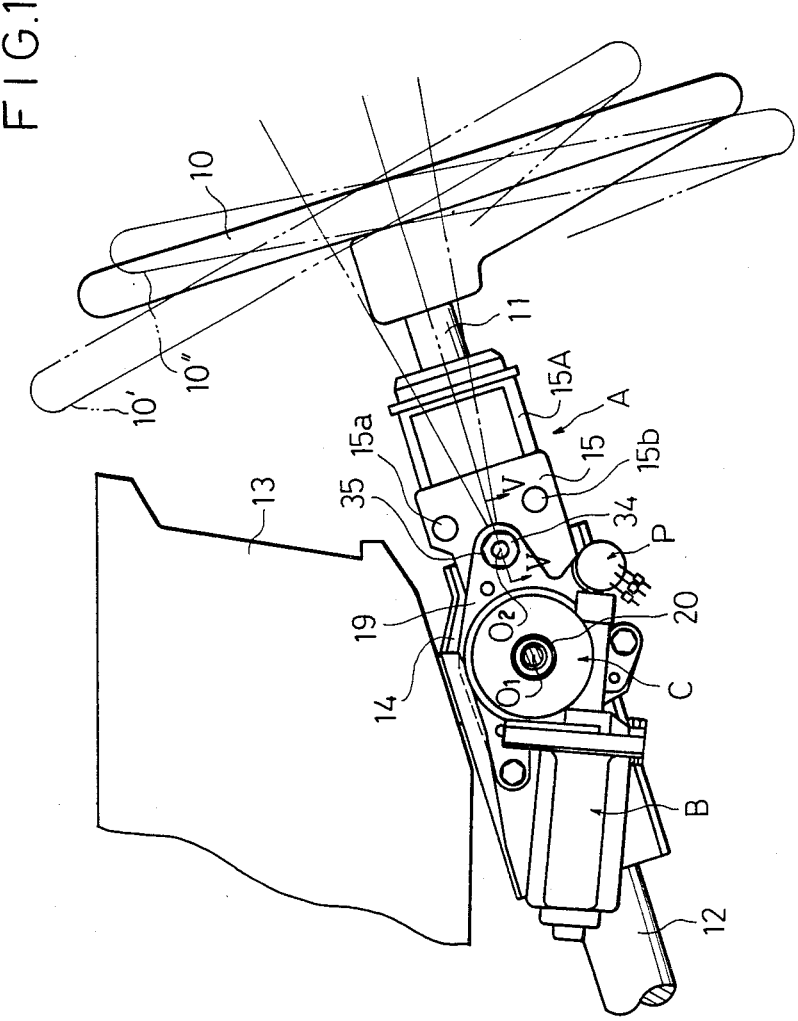
FIG. 1 is a side view illustrating an embodiment of a tilt steering equipment according to the present invention.

Hereinafter, the present invention will be explained in more detail in accordance with preferred embodiments thereof with reference to the accompanying drawings.

FIG. 1 is a whole side view of an embodiment according to the present invention. FIG. 2-A is a partial enlarged view as seen from the back side of the sheet face of FIG. 1. The tilt steering equipment A is provided to adjust an angle of an upper main shaft 11, to which a steering wheel 10 is mounted, relative to a lower main shaft (which is not shown but supported within a column tube 12 in a rotatable manner by means of bearing or the like). The tilt steering equipment A of this embodiment comprises a main bracket 14 mounted to a lower side of a dashboard 13; a rotary driving source B disposed on the main bracket 14; a reduction gear mechanism C actuated in association with the driving source B, an upper bracket 15 pivoted at the main bracket and tilted by rotation of an output shaft at the end of the reduction gear mechanism C, the upper bracket rotationally supporting the upper steering shaft; and a potentiometer P for detecting a tilt angle of the aforesaid upper main shaft 11. In this case, an engaging plate 38 is fixed to the upper bracket 15 by means of bolts 15a, 15b.

The rotary driving source B, for example, comprises an electric motor to facilitate a remote control of the equipment. There is a worm 17 fixed to the tip end of an output shaft 16 (FIGS. 3-A, 3-B) of this rotary driving source B and the worm 17 is engaged with a worm wheel 18 of the reduction gear mechanism C.

The reduction gear C decreases the rotational speed of revolution of the rotary driving source B thereby to increase a torque thereof. A planetary gear is employed for this purpose. The internal structure of this planetary gear will be explained hereinafter with reference to FIG. 3-A. At the center portion of a housing 19, there is disposed an eccentric shaft 20 rotatable round an axial center O1 (a drive center). One end of the eccentric shaft 20 is assembled so as to be rotated integral with the worm wheel 18 through a damper member 21 disposed in the worm wheel 18. The damper member 21 comprises a rubber damper 21A and a metallic plate 21B integrally fixed to the rubber damper and the inner peripheral portion of this metallic plate 21B is connected to the eccentric shaft 20 so as to be rotated in integral therewith.

The configuration of the eccentric shaft 20 is as shown in FIG. 4. The eccentric shaft 20 includes a center shaft portion 201 and an eccentric shaft portion 202 (in other words, which corresponds to an arm of the shaft 20). The axial center O1 (drive center) of the center shaft portion 201 and that of the eccentric shaft portion 202 are eccentric to each other by "e". There is formed a groove 203 at the outer periphery of the eccentric shaft portion 202 in the eccentric side thereof. And there are formed flat portions 204 at both sides of the groove 203. There are also another flat portion 205 in the center shaft portion 201.

Into the groove 203 of the eccentric shaft portion 202, there is inserted an elastic member 22 (made of rubber in this embodiment). The section of the elastic member 22 fits with the shape of the groove 23 but a height h of the elastic member 22 is slightly higher than the depth of the groove 203.

On the other hand, a collar 23 is attached to the outer periphery of the eccentric shaft portion 202 and a through hole 231 of the collar 23 is provided with plane portions 232 in opposite side faces thereof. These opposite plane portions 232 slidably fit with the flat portions 204 of the eccentric shaft portion 202. The collar 23 is pressed and forced by the elastic member 22 in the direction of an arrow "a" shown in FIG. 3-A (namely, in the direction of a planetary gear 24 being engaged with an internal gear 25, which will be described later).

In this case, since the height h of the elastic member 22 is slightly larger than the depth of the groove 203, the pushing action in the direction of arrow "a" is produced by the elastic force of the elastic member 22 when assembled as shown in FIG. 6. Therefore, the collar 23 can be slightly moved in the direction parallel to the plane including the both axial centers of the shaft portions 201, 202.

As shown in FIG. 4, the planetary gear 24 is attached to the outer periphery of the collar 23 receiving the elastic member 22 in the through hole 231 thereof. At the outer periphery of the planetary gear 24, there are formed gear teeth 241 and the gear teeth 241 are simultaneously engaged with two internal gears 25, 26. One internal gear 25 is fixed to the housing 19, wherein the other internal gear 26 has slightly different number of tooth from those of the gear 25 and the outer periphery thereof is slidably fitted to the housing 19 and an annular projected portion 261 (FIGS. 2-A and 3-A) formed at the inner peripheral wall of the gear 26 is fixed to a disk plate 27. As a result, when the planetary gear 24 is rotated, the integral body of the internal gear 26 and the plate 27 is subjected to super reduction of rotational speed thereof and is rotated as the output shaft of the reduction gear mechanism C around the drive center O1.

In this case, to the plate 27, there is fixed an engaging pin 28 (shown in FIG. 2-A) and in the opposite side of the pin 28 when the drive center O1 is taken as the center, there is formed a convex portion 29 (projecting in the vertical direction to the sheet face of FIGS. 2A and 2B) at the plate 27. Therefore, as described above, when the plate 27 is rotated as the output side of reduction gear C, the pin 28 and the convex portion 29 are rotated integral with each other. In this case, the rotating distance thereof is limited to a range of a rotational angle α within which the convex portion 29 can be rotated. Namely, a fixing plate 31 is fixed to the housing 19 by means of bolts 30a, 30b, 30c, and a projecting plane portion 31a, which projects in the surface side of the vertical direction to the sheet face of FIG. 2-A, is formed at the fixing plate 31. The convex portion 29 may contact opposite end faces 311, 312 of this plane portion 31a. The convex portion 29 is formed on the line connecting the axial center of the pine 28 and the drive center O1 as shown in FIG. 2-A, but it is not limited to this construction. The convex portion 29 and the end faces 311, 312 may be shifted in any direction so as to permit the movement of the pin 28 within the aforesaid range of α.

The fixing plate 31 and housing 19 are fixed to the main bracket 14 by means of bolts 33a, 33b and 34 (shown in FIGS. 1 and 2-A). The main bracket 14 is not shown in FIG. 2-A but is disposed at the surface side of the aforesaid projecting plane portion 31a in the vertical direction to the sheet face of FIG. 2-A.

As shown in FIG. 2-A, the engaging plate 38 is assembled to the upper bracket 15 and engages the engaging pin 28; the engaging plate 38 has an axial hole 38c and an engaging slotted hole 38b.

FIG. 5 is a sectional view taken along the line V—V of FIG. 1. The engaging plate 38 and the upper bracket 15 are assembled by means of the bolt 34, a nut 35 and washers 36, 37 so as to permit its being rotated relative to the main bracket 14. The center axis of the bolt becomes the tilt center C2 of the present equipment. Numerals 39 and 40 designate intermediate plates welded to the main brackt 14 and the engaging plate 38 respectively. A numeral 41 designates a metal bush. Into the slotted hole 38b of the engaging plate 38 is inserted the engaging pin 28 of the reduction gear C. The pin 28 can slide in the direction of the slotted axis of the slotted hole 38b and also can rotate in the slotted hole 38b. When the engaging pin 28 is rotated around the drive center C1, the engaging pin 28 pushes the engaging plate 38 through the engaging slotted hole 38b so that the engaging plate 38 swings around the tilt center C2 (around the bolt 34). Namely, the upper bracket 15 is tilted against the main bracket 14.

A main body 42 of the potentiometer P shown in FIGS. 2-A and 3-A is fixed to the housing 19 and a shaft 43 of the potentiometer P is covered with a rubber member 44 and the outer periphery of the rubber member 44 is always in contact with an end face 38a of the engaging plate 38. When the engaging plate 38 is moved with a swing, the rubber member 44 and the shaft 43 of the potentiometer P are rotated to convert this rotation into a change of current, whereby a moved or swung angle of the engaging plate 38 can be detected.

Next, the operation of this embodiment will be described. In case where a driver tries to tilt the steering wheel 10 to positions as indicated by an alternate long and two short dashes line 10' or 10'' in FIG. 1, he can turn a switch (not shown) ON to operate the rotary driving source B. As a result, the rotating force of this rotary driving source B is transmitted from the output shaft 16 thereof (shown in FIG. 3-A) to the pin 28 via, in sequence, worm 17, worm wheel 18, damper member 21, eccentric shaft 20, collar 23, planetary gear 24, internal gear 26, plate 27 and pin 28, whereby the aforesaid pin 28 is rotated at reduced speed round the drive center O1. Consequently, the engaging plate 38 is moved around the tilt center O2 through the slotted hole 38b associated with the pin 28. This movement of the engaging plate 38 is possible within a range of tilt angle α as shown in FIG. 2-A.

Since, the engaging plate 38 is fixed to the upper bracket 15 and the reduction gear C is fixed to the main bracket 14, the upper bracket 15 tilts relative to the main bracket 14. So that the upper main steering shaft 11 is tilted by the upper bracket 15.

In this tilt steering embodiment, the upper bracket 15 and the main bracket 14 are swingably connected to each other with the bolt 34 forming the tilt center O2 via the engaging pin 28 and the slotted hole 38b. Therefore the both brackets 14, 15 are easily assembled. Also the tile center O2 is not coaxial to the drive center O2 and the distance between the tilt center O2 and the engaging pin 28 is longer than the distance between the drive center O2 and the engaging pin 28. Therefore a small torque can tilt the upper bracket 15.

Instead of the engaging pin 28 and the slotted hole 38b of this embodiment, an engaging tapered pin 28' a slider 50 and an engaging rectangular hole 38'b shown in FIGS. 2-b, 3-B, 7 and 8 may be employed. The engaging pin 28' has a taper portion 28'b formed at the outer peripheral surface thereof and a female screw thread 28'a at the center thereof. The slider 50 has a tapered hole 50a, a slit 50b and a notch 50c in the axial direction of the tapered hole 50a. And two flat face portions 50d are also formed so as to interpose the slit 50b and notch 50c between the flat face portions 50c opposite to each other. The slider 50 is rotatably and slidably attached to the taper portion 28'b of the pin 28' through an washer 51 and an elastic member 52 (made of rubber in this embodiment) by means of a screw pin 53.

The flat face portions 50c of the slider 50 are contacted to both flat face portions 381, 382 of a rectangular hole 38'b formed at the tip end portion of an engaging plate 38' in a slidable manner. (The engaging plate 38' of this embodiment is the same as the engaging plate 38 of the former embodiment except the shape of the hole 38b.) The engaging plate 38' having the rectangular hole 38'b to be associated with the pin 28' is also provided with other holes 38'c, 38'c, 38'd and the engaging plate 38' is fixed to the upper bracket 15 by means of bolt 38'A, 38'B inserted into the holes 38'c, 38'c, respectively, as shown in FIG. 2-B.

In FIG. 8, a numeral 40 designates a bearing and it is attached to the disk plate 27 at the center thereof (see, FIG. 3-B).

Hereinafter, the operation of this embodiment will be described.

In the same manner as in the foregoing embodiment, if a driver wishes to tilt the steering wheel 10 to positions as indicated by alternate long and two short dashes line 10' or 10'' in FIG. 1, he can turn a switch (not shown) ON to operate the rotary driving source B. As a result, rotational force of this rotary driving source B is transmitted from the output shaft 16 thereof (FIG. 3-B) to the tapered engaging pin 28' via, in sequence, worm 17, worm wheel 18, damper member 21, eccentric shaft 20, collar 23, planetary gear 24, internal gear 26, plate 27 and tapered pin 28', whereby the tapered pin 28' is rotated with a reduced low speed round the drive center O1. Consequently, the engaging plate 38' is moved or swung about the tilt center O2 of the bolt 34 by the rectangular hole 38'b associated with the pin 28'. This movement of the attachment 38' is allowed within a range of tilt angle α as shown in FIG. 2-B.

In this case, the tapered pin 28' is rotated round the drive center O1 but the engaging plate 38' is moved round the tilt center O2. Therefore, there is produced a relative movement between the flat face portions 50d of the slider 50 and the flat face portions 381, 382 of the engaging plate 38'. In other words, the slider 50 is slidably reciprocated within the rectangular hole 38'b of the engaging plate 38'. When the steering wheel 10 is in the solid line shown in FIG. 1 (a neutral state), the slider 50 is at the most distance from the tilt center O2, but when the steering wheel 10 is tilted as shown in the alternate long and short dashes line 10' or 10' of FIG. 1, the distance from the slider 50 to the tilt center O2 is gradually shortened as the wheel 10 is more tilted.

Between the taper portion 28'b of the pine 28' and the tapered hole 50a of the slider 50, there is produced a relative rotation thereof at the time when the steering wheel 10 is tilted.

The slider 50 is provided with the slit 50b and notch 50c and is pushed in the direction of the taper portion 28'b thereof by means of the pin 53 through the elastic member 52 interposed therebetween. In this case, there is always formed a clearance t (FIG. 7) between the tip end face of the slider 50 and the pin 53 and therefore, the slider 50 is forced in the direction of the taper portion 28'b by an elastic force of the elastic member 52. Namely, it is forced in the direction of the slit 50b being expanded or opened. Therefore, even if the flat face portion 50c of the slider 50, the flat face portions 381, 382 of the rectangular hole 38'b or the taper portion 28'b of the tapered pin 28' are worn, this worn amount can be sufficiently compensated by the aforesaid opening movement of the slider 50 within the hole 38b based on the elastic force of the elastic member 52.

The washer 51 holds the elastic member 52 and also serves to smooth the relative rotation between the tapered pin 28' and the slider 50.

In this embodiment, there are no gaps between the engaging pin 28', the slider 50 and the engaging plate 38'. Therefore no backlashes are generated.

In the foregoing embodiment, as the elastic member 22 (shown in FIG. 6), a rubber member was employed to force the planetary gear 24 in the engagement direction thereof. But other means as shown in FIGS. 9 and 10 may be also employed as other modifications thereof.

In FIGS. 9 and 10, as the elastic member, a plate spring 221 and a snap ring 222 are employed, respectively. In either of these cases, the planetary gear is forced in the engagement direction thereof by the plate spring 221 or the snap ring 222.

In the foregoing embodiment and modifications, the internal gear 26 and the disk plate 27 fixed thereto constitute the output member of the reduction gear C. However, the reduction gear C according to the present invention is not limited to this construction but instead, for example, an appropriate pin may be fixed to the planetary gear 24 to define the output member of the reduction gear C, as a further modificaion thereof.

Obviously, numerous modifications and variations of the present invention are possible in light the above teachings. It is therefore to be understood that within the scope of the appended claims, the invention may be practiced otherwise than as specifically described herein.

What is claimed is:

1. In a tilt steering equipment comprising:
    a main bracket mounted to a vehicle body;
    an upper bracket which rotationally supports an upper steering shaft having a steering wheel and which is pivoted to said main bracket around a tilt axis;
    a driving means situated between said main bracket and said upper bracket for tilting said main bracket and said upper bracket in relation to each other around said tilt axis,
    said driving means is fixed to one of said main bracket and said upper bracket and has a drive axis spaced from and approximately parallel to said tilt axis, and a first engaging means rotating around said drive axis, and
    the other one of said main bracket and said upper bracket has a second engaging means being engaged by said first engaging means.

2. A tilt steering equipment according to claim 1, wherein
    a distance between the engaging point of said first engaging means and said second engaging means and said tilt axis is longer than the distance between said engaging point and said drive axis.

3. A tilt steering equipment according to claim 1, wherein
    said upper bracket comprises:
    an engaging plate including said second engaging means.

4. A tilt steering equipment according to claim 1, wherein
    said driving means includes a rotary driving source and a reduction gear mechanism, and
    said first engaging means of the driving means is fixed to an output gear of said reduction gear mechanism.

5. A tilt steering equipment according to claim 1, wherein
    one of said first engaging means and said second engaging means is an engaging pin and the other one of said first engaging means and said second engaging means is an engaging hole in which said engaging pin is inserted.

6. A tilt steering equipment according to claim 5, wherein
    said engaging pin includes a tapered pin and an extendable sliding member being fitted in a relatively rotatable manner to said tapered pin,
    said engaging hole is a slotted hole being formed so as to support said sliding member in a slidable manner at a pair of guide faces thereof opposite to each other,
    said sliding member includes a tapered-shaped axial hole therein to be fitted to said tapered pin, at least one slit extending to said axial hole and a pair of sliding surfaces at the outer periphery thereof, which is divided by said slit, said sliding surfaces thereof being in slidable contact with said pair of guide faces of said slotted hole.
    between said tapered pin and said sliding member, there is interposed a force means for pushing said sliding member against said tapered pin,
    whereby said sliding member and said tapered pin are made in contact with each other due to said pushing force of said force means and the slit formed in said sliding member is opened to make said pair of sliding surfaces of the sliding member in contact with said pair of guide faces of said engaging hole.

7. A tilt steering equipment according to claim 6, wherein
    said force means comprises:
    a flanged pin member being fixed at the tip end of said tapered pin, and
    an elastic member to be pressed by the said flanged pin member.

8. A tilt steering equipment according to claim 4, wherein
    said reduction gear mechanism comprises:
    a housing being fixed to one of said main bracket and said upper bracket;
    an eccentric shaft comprising a center shaft portion for an input means of said reduction gear mechanism being rotatably supported at said housing and an eccentric shaft portion being fixed to said center shaft portion so as to be integrally rotated with said center shaft portion;
    a planetary gear being rotatably supported at said eccentric shaft portion;
    a first internal gear being fixed to said housing to be engaged with said planetary gear; and
    an output means rotatably supported in said housing and including a second internal gear being engaged with said planetary gear and one of said first engaging means and said second engaging means, which is fixed to said second internal gear.

9. A tilt steering equipment according to claim 8, wherein
    said eccentric shaft portion for supporting said planetary gear in a rotatable manner is provided with a pressing means for forcing said planetary gear in the centrifugal direction of said eccentric shaft portion to push said planetary gear against at least one of said first and second internal gears.

10. A tilt steering equipment according to claim 9, wherein
    said pressing means comprises:
    a collar member having a central through hole for receiving said eccentric portion thereinto, said collar member supporting said planetary gear in a rotatable manner at the outer periphery thereof; and
    an elastic member interposed between the central through hole of said collar member and said eccentric portion, for forcing said collar member in the centrifugal direction of said eccentric portion.

11. A tilt steering equipment according to claim 10, wherein
said elastic member is one of members selected from the group consisting of a rubber member, a plate spring and a snap ring.

12. A tilt steering equipment according to claim 1, wherein said driving axis is situated between a tilt axis $O_2$ and the engaging point of said first engaging means and said second engaging means.

13. A tilt steering equipment according to claim 12, wherein said tilt axis $O_2$, said engaging point, and said drive axis $O_1$ are on an approximately straight line.

* * * * *